US012752157B2

(12) United States Patent
Lee et al.

(10) Patent No.: US 12,752,157 B2
(45) Date of Patent: Oct. 6, 2026

(54) EXERCISE COACHING DEVICE BASED ON ARTIFICIAL INTELLIGENCE

(71) Applicant: LG ELECTRONICS INC., Seoul (KR)

(72) Inventors: Areum Lee, Seoul (KR); Junyoung Huh, Seoul (KR); Jaewoo Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 611 days.

(21) Appl. No.: 18/029,541

(22) PCT Filed: Sep. 28, 2021

(86) PCT No.: PCT/KR2021/013278
§ 371 (c)(1),
(2) Date: Mar. 30, 2023

(87) PCT Pub. No.: WO2022/092589
PCT Pub. Date: May 5, 2022

(65) Prior Publication Data

US 2023/0364467 A1 Nov. 16, 2023

(30) Foreign Application Priority Data

Oct. 27, 2020 (KR) ........................ 10-2020-0140074

(51) Int. Cl.
*A63B 24/00* (2006.01)
*G06V 10/82* (2022.01)
*G06V 40/10* (2022.01)

(52) U.S. Cl.
CPC .......... *A63B 24/0006* (2013.01); *G06V 10/82* (2022.01); *G06V 40/10* (2022.01); *A63B 2024/0015* (2013.01)

(58) Field of Classification Search
CPC ........ A63B 24/0006; A63B 2024/0015; G06V 40/10; G06V 10/82
See application file for complete search history.

(56) References Cited

U.S. PATENT DOCUMENTS 7,433,805 B2 * 10/2008 Vock ...................... A42B 3/046
235/444
7,988,647 B2 * 8/2011 Bunn .................. A61B 5/7264
600/595

(Continued)

FOREIGN PATENT DOCUMENTS

KR 10-2018-0064907 A 6/2018
KR 10-1909693 B1 10/2018

(Continued)

*Primary Examiner* — Malina D. Blaise
(74) *Attorney, Agent, or Firm* — Birch, Stewart, Kolasch & Birch, LLP

(57) ABSTRACT

An exercise coaching device based on artificial intelligence is proposed. According to an exemplary embodiment, an exercise pose extraction unit of the exercise coaching device may generate pose data by extracting an exercise pose of an exercising object from an exercise image captured by an image capturing unit. In addition, an exercise pose analysis unit may receive the pose data based on the artificial intelligence and infer whether the exercise pose is in a correct posture. In addition, the exercise coaching device according to the exemplary embodiment may be configured to further include a coaching information output unit configured to output exercise coaching information on the basis of an inference result of the exercise pose analysis unit. In this way, whether the exercise posture is correct or not is inferred accurately on the basis of the artificial intelligence, and thus appropriate exercise coaching information may be provided to a user.

11 Claims, 6 Drawing Sheets

(56) References Cited

U.S. PATENT DOCUMENTS

| | | | | |
|---|---|---|---|---|
| 8,523,667 | B2 * | 9/2013 | Clavin | G06V 40/103 715/810 |
| 8,911,328 | B2 * | 12/2014 | Alessandri | G16H 20/30 482/901 |
| 9,154,739 | B1 * | 10/2015 | Nicolaou | H04N 7/18 |
| 10,811,055 | B1 * | 10/2020 | Kimber | G11B 27/005 |
| 11,961,601 | B1 * | 4/2024 | Kissos | G16H 20/30 |
| 2003/0077556 | A1 * | 4/2003 | French | A61B 5/1118 434/258 |
| 2007/0050715 | A1 * | 3/2007 | Behar | G16H 40/67 600/300 |
| 2009/0062092 | A1 * | 3/2009 | Mortimer | A63B 24/00 482/142 |
| 2010/0210359 | A1 * | 8/2010 | Krzeslo | A63F 13/213 463/31 |
| 2010/0210975 | A1 * | 8/2010 | Anthony, III | A61B 5/1123 600/595 |
| 2012/0268592 | A1 * | 10/2012 | Aragones | A61B 5/1118 702/19 |
| 2012/0271143 | A1 * | 10/2012 | Aragones | G09B 5/02 600/595 |
| 2013/0324368 | A1 * | 12/2013 | Aragones | A61B 5/6807 482/8 |
| 2016/0249866 | A1 * | 9/2016 | Ring | A61B 5/1114 600/595 |
| 2018/0261316 | A1 * | 9/2018 | Spooner | A63B 24/0062 |
| 2021/0001172 | A1 * | 1/2021 | Namboodiri | A63B 24/0062 |
| 2021/0008413 | A1 * | 1/2021 | Asikainen | G06F 3/0304 |
| 2021/0060385 | A1 * | 3/2021 | Karlsson | A63B 24/0003 |
| 2021/0154529 | A1 * | 5/2021 | Barr | G06T 13/40 |
| 2021/0209349 | A1 * | 7/2021 | Mehl | G06N 3/0464 |
| 2021/0307650 | A1 * | 10/2021 | Barr | A61B 5/1121 |
| 2022/0072380 | A1 * | 3/2022 | Trehan | G16H 50/20 |
| 2022/0076666 | A1 * | 3/2022 | Trehan | G06V 10/82 |
| 2022/0331028 | A1 * | 10/2022 | Sternitzke | A61B 5/1176 |
| 2023/0145150 | A1 * | 5/2023 | Martinez | G06V 40/20 382/156 |
| 2023/0364467 | A1 * | 11/2023 | Lee | A63B 24/0006 |
| 2024/0135617 | A1 * | 4/2024 | Lagrone | G16H 40/67 |

FOREIGN PATENT DOCUMENTS

| | | | |
|---|---|---|---|
| KR | 10-1970687 | B1 | 4/2019 |
| KR | 10-2019-0081538 | A | 7/2019 |
| KR | 10-1980378 | B1 | 8/2019 |
| KR | 10-2071532 | B1 | 1/2020 |
| KR | 10-2020-0029180 | A | 3/2020 |
| KR | 10-2020-0084395 | A | 7/2020 |

* cited by examiner

EXERCISE COACHING DEVICE BASED ON ARTIFICIAL INTELLIGENCE

CROSS REFERENCE TO RELATED APPLICATIONS

This application is the National Phase of PCT International Application No. PCT/KR2021/013278, filed on Sep. 28, 2021, which claims priority under 35 U.S.C. 119(a) to Patent Application No. 10-2020-0140074, filed in the Republic of Korea on Oct. 27, 2020, all of which are hereby expressly incorporated by reference into the present application.

TECHNICAL FIELD

The present disclosure relates to an exercise coaching device based on artificial intelligence and, more particularly, to an exercise coaching device based on artificial intelligence, wherein an exercise coaching function is provided through inference based on the artificial intelligence.

BACKGROUND ART

Recently, as part of self-management, home training in which a person exercises for health management at home, which is his or her own Querencia, without jogging or visiting a fitness center, has become a trend. In line with such a trend, not only various exercise devices for the home training are proposed, but even a newly-coined word called Home-T jok (meaning, a home-training tribe) has been created.

In the case of home training, while there is a strong point of being able to exercise in one's own space, those who lack training-related knowledge may wonder how to exercise by themselves. In particular, in a case of health training, continuing to exercise in a wrong posture may cause problems in muscles or joints of an exercising person, so proper coaching is required.

In recent years, information on exercise has been shared through various media such as YouTube, thereby increasing information accessibility, but it is difficult to correct one's exercise posture merely by watching videos.

Accordingly, when a method for checking whether one's exercise posture is correct or not is provided, it may be helpful to increase exercise effects.

DISCLOSURE

Technical Problem

An objective of the present disclosure is to provide an exercise coaching device based on artificial intelligence, wherein whether a user's exercise pose is in a correct posture or not may be accurately analyzed by using an artificial intelligence technology.

Another objective of the present disclosure is to provide an exercise coaching device based on artificial intelligence, wherein a user is enabled to correct his or her own posture into a correct posture on the basis of an exercise pose analyzed through an artificial intelligence technology.

A yet another objective of the present disclosure is to provide an exercise coaching device based on artificial intelligence, wherein a user is able to correct a posture by intuitively checking a difference between a user's own exercise pose and a correct posture.

Technical Solution

According to an exemplary embodiment of the present disclosure, an exercise coaching device based on artificial intelligence includes an image capturing unit configured to capture an exercise image of an exercising object.

The exercise coaching device according to an exemplary embodiment of the present disclosure may be configured to further include an exercise pose extraction unit. The exercise pose extraction unit may generate pose data by extracting an exercise pose of the exercising object from the exercise image.

The exercise coaching device according to an exemplary embodiment of the present disclosure may be configured to further include an exercise pose analysis unit. The exercise pose analysis unit is based on the artificial intelligence and configured to receive the pose data and infer whether the exercise pose is in a correct posture or not.

The exercise coaching device according to an exemplary embodiment of the present disclosure may be configured to further include a coaching information output unit for outputting exercise coaching information on the basis of an inference result of the exercise pose analysis unit.

According to the exemplary embodiment of the present disclosure, the exercise pose extraction unit may extract, as the exercise pose, a plurality of key points preset for the exercising object in the exercise image.

As an example, the key points may include at least two or more positions of both eyes, both ears, the nose, the neck, hips, and a plurality of joints.

According to the exemplary embodiment of the present disclosure, the exercise pose extraction unit may extract the key points in units of a predetermined number of frames from the exercise image of predetermined one cycle. In addition, the exercise pose extraction unit may generate the pose data by converting the key points for one cycle into time-series coordinate data.

According to the exemplary embodiment of the present disclosure, the exercise pose analysis unit may be configured to include an artificial intelligence model. The artificial intelligence model may receive the pose data and infer whether the exercise pose is in the correct posture or not.

According to the exemplary embodiment of the present disclosure, the artificial intelligence model may be generated by learning with correct posture learning data and at least two or more types of incorrect posture learning data. In addition, the artificial intelligence model may infer the exercise pose as any one of the correct posture and the at least two or more types of incorrect postures.

According to the exemplary embodiment of the present disclosure, the exercise pose analysis unit may be configured to further include a data pre-processing unit. According to the exemplary embodiment of the present disclosure, the data pre-processing unit may pre-process the pose data obtained from the exercise pose extraction unit so as to correspond to a format of input data of the artificial intelligence model.

As an example, in a case where there exists a key point missing from the pose data, the data pre-processing unit may restore pose data for the corresponding key point through a pre-registered interpolation technique.

According to the exemplary embodiment of the present disclosure, the data pre-processing unit may receive an input of exercise type information of a current exercise of the exercising object. In addition, the data pre-processing unit may extract pose data for the key points according to the exercise type information from the pose data, and transmits the extracted pose data as the input data of the artificial intelligence model.

According to the exemplary embodiment of the present disclosure, the exercise pose analysis unit may be configured to further include an inference result generation unit configured to generate, as the exercise coaching information, correction information for posture correction in a case where the artificial intelligence model infers that the exercise pose is the incorrect posture.

According to the exemplary embodiment of the present disclosure, the coaching information output unit may be configured to include: an image display unit and a GUI management unit. According to the exemplary embodiment of the present disclosure, the GUI management unit may display the exercise coaching information generated by the inference result generation unit on the image display unit.

According to the exemplary embodiment of the present disclosure, the exercise coaching information may include a correction image in which correction points, in the correct posture, corresponding to the respective key points are displayed. In addition, the GUI management unit may display the correction image on the image display unit.

In the exemplary embodiment, the GUI management unit may display an object image for the exercising object photographed by the image capturing unit on the image display unit. In addition, the GUI management unit may overlap and display the correction points on the exercising object in the object image.

In the exemplary embodiment, the GUI management unit may display, on the image display unit, correction points corresponding to key points inferred as the correct posture and correction points corresponding to key points inferred as the incorrect posture, which are inferred by the artificial intelligence model, so as to be visually distinguished from each other.

Advantageous Effects

The exercise coaching device based on artificial intelligence according to the present disclosure has one or more of the following effects.

First, there is provided an effect that whether a user's exercise pose is in a correct posture or not may be analyzed and provided more accurately by using an artificial intelligence technology.

Second, there is provided an effect that a more accurate exercise posture may be analyzed through inference in which time-series relationships are reflected by learning and inferring an exercise pose in units of one cycle.

Third, there is provided an effect that information may be checked for intuitive correction of posture by providing exercise coaching information for correction of an exercise posture through images and/or voices.

BEST MODE

Figure 1:
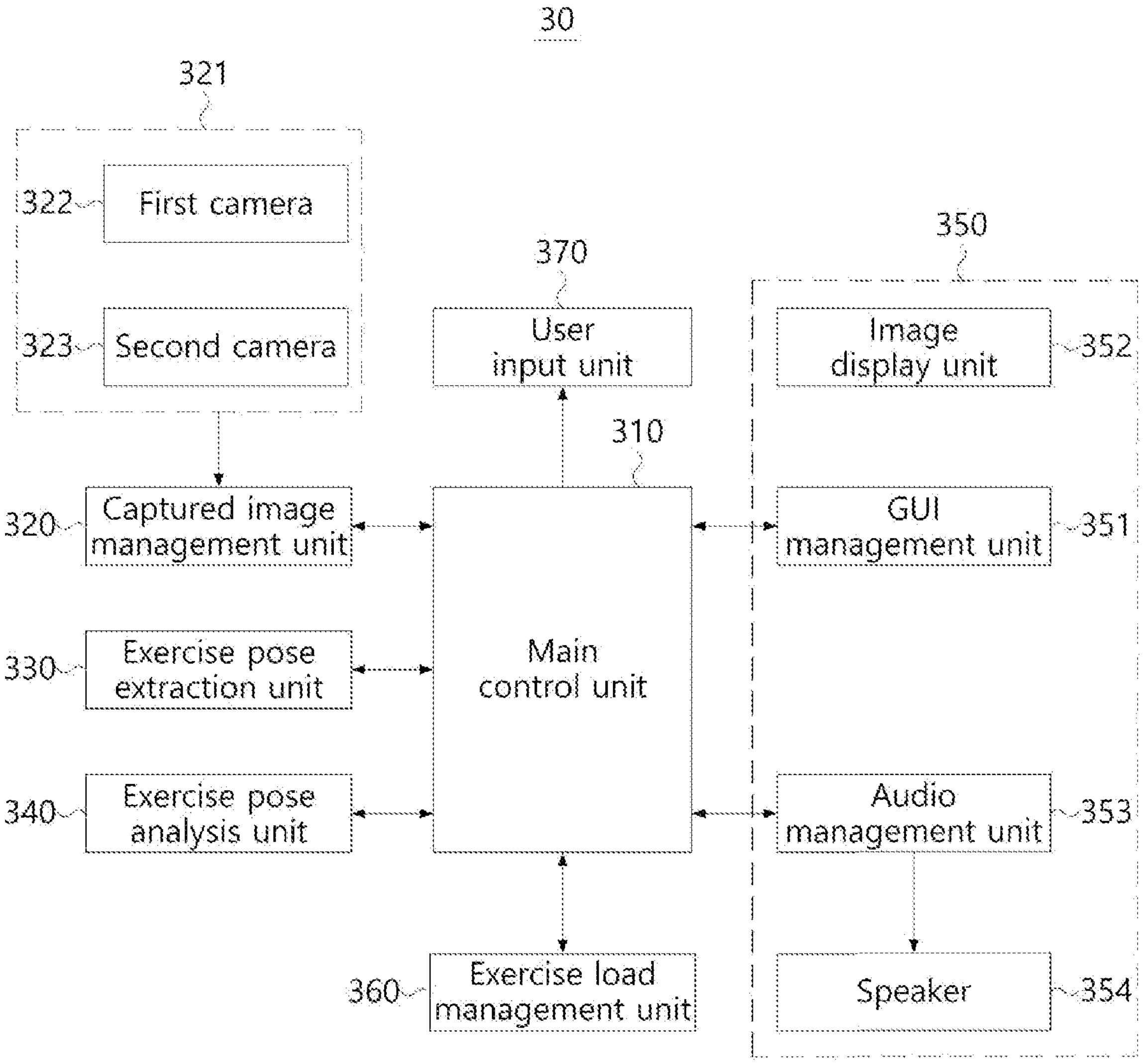
FIG. 1 is a control block diagram of an exercise coaching device based on artificial intelligence according to an exemplary embodiment of the present disclosure.

The present disclosure relates to an exercise coaching device based on artificial intelligence.

An exercise pose extraction unit of the exercise coaching device according to an exemplary embodiment of the present disclosure may generate pose data by extracting an exercise pose of an exercising object from an exercise image captured by an image capturing unit. In addition, an exercise pose analysis unit may receive an input of the pose data based on artificial intelligence and infer whether the exercise pose is in a correct posture or not. In addition, the exercise coaching device according to the exemplary embodiment of the present disclosure may be configured to further include a coaching information output unit configured to output exercise coaching information on the basis of an inference result of the exercise pose analysis unit.

MODE FOR INVENTION

Advantages and features of the present disclosure and the methods of achieving the same will become apparent with reference to an exemplary embodiment described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

FIG. 1 is a control block diagram of an exercise coaching device 30 based on artificial intelligence according to an exemplary embodiment of the present disclosure.

Describing with reference to FIG. 1, the exercise coaching device 30 according to the exemplary embodiment of the present disclosure may be configured to include an image capturing unit 321, an exercise pose extraction unit 330, an exercise pose analysis unit 340, and a coaching information output unit 350. In addition, the exercise coaching device 30 according to the exemplary embodiment of the present disclosure may be configured to further include a main control unit 310.

The main control unit 310 controls overall functions of one or more different components of the exercise coaching device 30, for example, functions of the image capturing unit 321, the exercise pose extraction unit 330, the exercise pose analysis unit 340, and the coaching information output unit 350, and may perform various functions of data processing or calculation. The main control unit 310 according to the exemplary embodiment of the present disclosure may be configured to include hardware components such as a processor and a memory, and software components such as an operating system.

The image capturing unit 321 according to the exemplary embodiment of the present disclosure may capture an exercise image of a user who is an exercising object H (See FIG. 5, the same below). In the exemplary embodiment of the present disclosure, as an example, the image capturing unit 321 is composed of a plurality of cameras.

In the exemplary embodiment of the present disclosure, as an example, the image capturing unit 321 includes a first camera 322 and a second camera 323. For example, the first camera 322 may be provided to photograph a front surface of the exercising object at the front of the exercising object. The second camera 323 may be provided to photograph a side surface of the exercising object at the side of the exercising object.

In the exemplary embodiment, the first camera 322 and second camera 323 may include one or more lenses, image sensors such as CMOS or CCD, image signal processors, and the like. In addition, images captured by the first camera 322 and second camera 323 may be RGB images or RGBD images.

As shown in FIG. 1, the exercise coaching device 30 according to the exemplary embodiment of the present disclosure may be configured to further include a captured image management unit 320.

According to the exemplary embodiment, the captured image management unit 320 may control the image capturing unit 321 to capture an exercise image of the exercising object in association with the main control unit 310. In addition, the image capturing unit 321 may transmit the captured exercise image to the main control unit 310 or the exercise pose extraction unit 330.

Meanwhile, the exercise pose analysis unit 340 according to the exemplary embodiment of the present disclosure receives an exercise image, which is captured by the image capturing unit 321, from the captured image management unit 320. As an example, when a user inputs an event of executing an exercise coaching function through the user input unit 370, the main control unit 310 may transmit the corresponding event to the captured image management unit 320, the exercise pose extraction unit 330, and the exercise pose analysis unit 340. In this case, the captured image management unit 320 may control the image capturing unit 321 to capture the exercise image of the exercising object according to the corresponding event, and transmit the exercise image captured by the image capturing unit 321 to the exercise pose extraction unit 330.

The exercise pose extraction unit 330 according to the exemplary embodiment of the present disclosure may extract an exercise pose of the exercising object from the exercise image. In addition, the exercise pose extraction unit 330 may generate pose data by using the extracted exercise pose.

Figure 2:
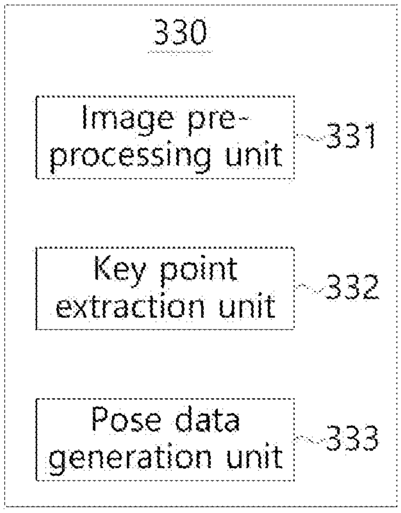
FIG. 2 is a view illustrating an example of a configuration of an exercise pose extraction unit according to the exemplary embodiment of the present disclosure.

FIG. 2 is a view illustrating an example of a configuration of the exercise pose extraction unit 330 according to the exemplary embodiment of the present disclosure. As shown in FIG. 2, the exercise pose extraction unit 330 according to the exemplary embodiment of the present disclosure may be configured to include an image pre-processing unit 331, a key point extraction unit 332, and a pose data generation unit 333.

The image pre-processing unit 331 according to the exemplary embodiment of the present disclosure may pre-process the exercise image transmitted from the captured image management unit 320 to extract an exercise pose. As an example, the image pre-processing unit 331 may resize the exercise image to a preset size so that the exercise image having a predetermined standard may be transmitted to the key point extraction unit 332 or the exercise pose extraction unit 330.

The key point extraction unit 332 according to the exemplary embodiment of the present disclosure may extract an exercise pose from the exercise image preprocessed by the image pre-processing unit 331. In the exemplary embodiment, the key point extraction unit 332 may extract, as the exercise pose, a plurality of key points preset for an exercising object from the exercise image.

Figure 3:
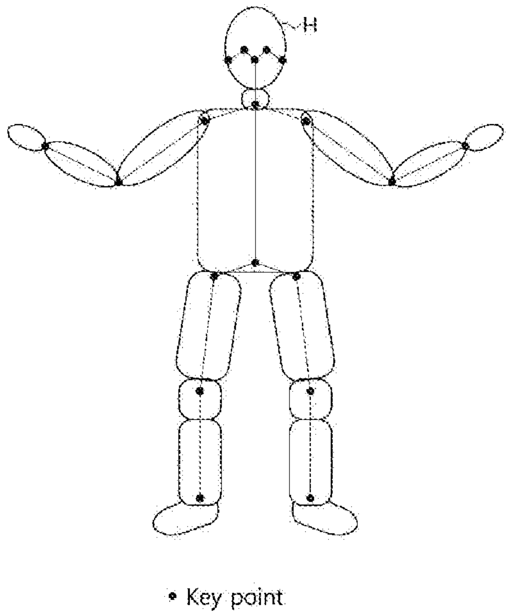
FIG. 3 is a view illustrating an example of key points extracted by the exercise pose extraction unit according to the exemplary embodiment of the present disclosure.

In the present disclosure, as shown in FIG. 3, the key points include positions of parts of a user who is an exercising object, for example, the parts including both eyes, both ears, the nose, the neck, hips, and a plurality of joint. In the exemplary embodiment, the positions of the plurality of joints may include the positions of both shoulders, both elbows, both hands or wrists, both hips, both knees, and both ankles. In the exemplary embodiment of the present disclosure, as an example, the key point extraction unit 332 extracts the key points from the exercise image by using OpenVINO Library.

The pose data generation unit 333 according to the exemplary embodiment of the present disclosure may generate pose data by using key points extracted by the key point extraction unit 332. The pose data has a format of data to be applied as input data of the artificial intelligence model 342 of the exercise pose analysis unit 340 to be described later.

Here, in the exemplary embodiment of the present disclosure, as an example, the key point extraction unit 332 extracts key points in units of a preset number of frames from exercise images of a preset one cycle. For example, the exercise images of one cycle may be set as images for one workout of a corresponding exercise, and a time period during which an initial motion is started and back to the initial motion again may be set as one cycle.

In the exemplary embodiment of the present disclosure, as an example, the pose data generation unit 333 converts the one cycle key points extracted by the key point extraction unit 332 into time-series coordinate data and generates the time-series coordinate data as pose data. For example, assuming that 30 frames of images are extracted from exercise images for one cycle, pose data in a form of a two-dimensional (2D) array may be generated by stacking key point coordinates, that is, coordinates of X-axis and Y-axis, in an array form.

Meanwhile, the exercise pose analysis unit 340 according to the exemplary embodiment of the present disclosure may receive an input of the pose data from the exercise pose extraction unit 330 and infer whether the exercise pose is in a correct posture or not. In the exemplary embodiment of the present disclosure, as an example, the exercise pose analysis unit 340 infers whether the exercise pose is in the correct posture or not on the basis of artificial intelligence.

Figure 4:
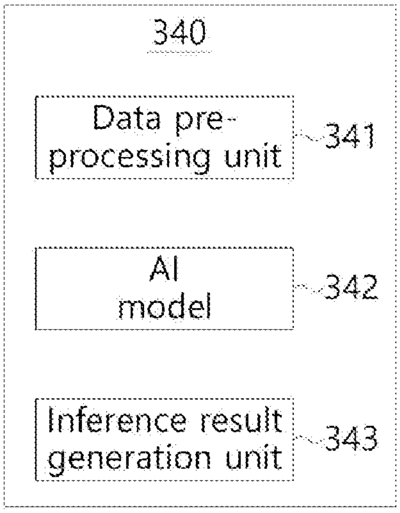
FIG. 4 is a view illustrating an example of a configuration of an exercise pose analysis unit according to the exemplary embodiment of the present disclosure.

FIG. 4 is a view illustrating an example of a configuration of the exercise pose analysis unit 340 according to the exemplary embodiment of the present disclosure. As shown in FIG. 4, the exercise pose analysis unit 340 according to the exemplary embodiment of the present disclosure may include an artificial intelligence model 342 configured to perform artificial intelligence-based inference. In addition, the exercise pose analysis unit 340 according to the exemplary embodiment of the present disclosure may be configured to further include a data pre-processing unit 341 and an inference result generation unit 343.

The data pre-processing unit 341 according to the exemplary embodiment of the present disclosure may pre-process the pose data received from the exercise pose extraction unit 330 according to the standard of input data of the artificial intelligence model 342.

For example, by using a preset interpolation technique, the data pre-processing unit 341 may recover a missing key point among the key points included in the pose data transmitted from the exercise pose extraction unit 330. In the present disclosure, it is exemplified that the data pre-processing unit 341 recovers the missing key point through a linear interpolation technique, but other interpolation techniques, for example, the polynomial interpolation technique or spline interpolation technique, may be applied. In addition, the data pre-processing unit 341 may perform scaling of the pose data according to the standard of the input data of the artificial intelligence model 342.

The artificial intelligence model 342 according to the exemplary embodiment of the present disclosure may receive an input of the pose data preprocessed by the data pre-processing unit 341 and infer whether an exercise pose is in a correct posture or not. As an example, the artificial intelligence model 342 according to the exemplary embodiment of the present disclosure may be created by learning with a plurality of pieces of correct posture learning data and at least two or more types of incorrect posture learning data. The incorrect posture learning data is learned by classifying the types of incorrect posture into a plurality of forms, so that which form of an incorrect posture a user has may be checked and information required to correct the incorrect posture of the corresponding type may be provided as well when exercise coaching information, which will be described later, is generated.

Through such a learning process, the artificial intelligence model 342 according to the exemplary embodiment of the present disclosure may infer the exercise pose as any one of the correct postures and at least two or more types of incorrect postures through inference of the pose data.

In the exemplary embodiment of the present disclosure, as an example, the artificial intelligence model 342 is designed on the basis of a Convolution Neural Network (CNN). In this way, relationships between the plurality of key points may be reflected in the inference process through the CNN, so more accurate inference may be ensured.

Figure 5:
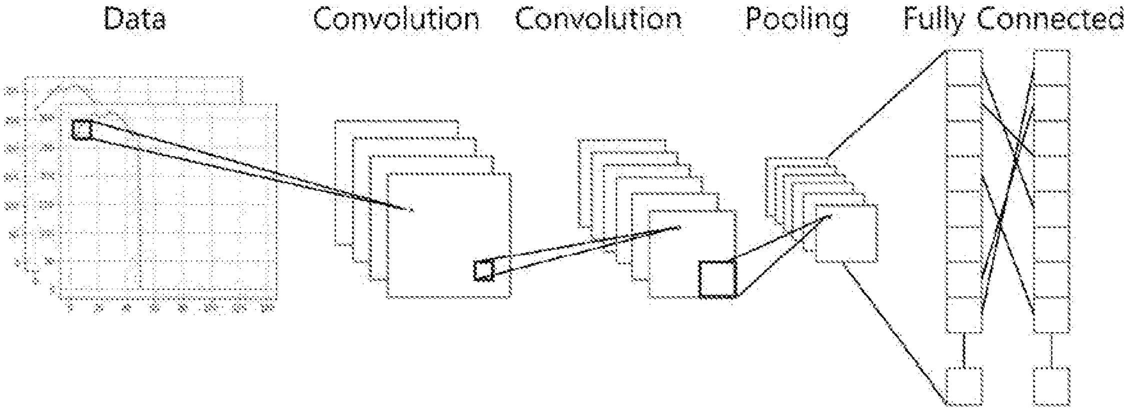
FIG. 5 is a view illustrating an example of a structure of an artificial intelligence model according to the exemplary embodiment of the present disclosure.

FIG. 5 is a view illustrating an example of a structure of the artificial intelligence model 342 according to the exemplary embodiment of the present disclosure. Describing with reference to FIG. 5, as described above, the pose data according to the exemplary embodiment of the present disclosure is time-series coordinate data, and as an example, the pose data has a one-dimensional (1D) CNN structure that is advantageous for analyzing data having a time domain.

The number of nodes of an input layer may be set according to the number of key points, the number of frames constituting one cycle, and the number of coordinates. For example, as described above, in a case where the number of key points is 19, the number of frames in one cycle is 120, and coordinates of the key points are composed of two coordinates x and y, the number of nodes in the input layer may be set to 4560.

A convolution layer performs a feature extraction function, and in the exemplary embodiment of the present disclosure, as an example, the artificial intelligence model 342 includes two convolution layers. In addition, in the exemplary embodiment of the present disclosure, as an example, a 3×3 convolution filter is applied to each of the two convolution layers so as to simplify the structure of the artificial intelligence model 342 and improve performance thereof. In addition, in the exemplary embodiment, as an example, the number of output feature maps of each convolution layer is set to 10.

In the exemplary embodiment of the present disclosure, as an example, a max pooling layer is connected to the rear end of a convolution layer. In addition, as an example, a fully connected layer is connected to the rear end of the max pooling layer in order to output an inference result. As an example, the number of nodes of the fully connected layer is set to be 1000 for use.

As an example, an ReLU function is used as an activation function of the artificial intelligence model 342 according to the exemplary embodiment of the present disclosure, and as an example, batch normalization is applied to all of the convolutional layers and fully connected layers.

The design of the artificial intelligence model 342 as described above is just one exemplary embodiment, and other structural designs may be applicable. Further, other deep learning-based algorithms such as K-Nearest Neighborhood (KNN) or Deep Neural Network (DNN) is applicable in addition to CNN.

The inference result generation unit 343 according to the exemplary embodiment of the present disclosure may generate, as exercise coaching information, correction information for posture correction in a case where an exercise pose is inferred as an incorrect posture by the artificial intelligence model 342, for example, is inferred as one of the two or more types of incorrect postures described above. As an example, in a state in which the correction information for correction for each incorrect posture is pre-registered, when the incorrect posture is inferred by the artificial intelligence model 342, the exercise coaching information may be generated on the basis of the correction information corresponding to the inferred incorrect posture.

Here, in the exemplary embodiment of the present disclosure, as an example, the image capturing unit 321 includes a first camera 322 and a second camera 323. Any one of exercise images captured by the first camera 322 and the second camera 323 may be input to the exercise pose extraction unit 330 and exercise pose analysis unit 340 to go through a process of inferring correct posture. For example, an image captured by any one of the first camera 322 and the second camera 323 may be provided and applied to the inference process according to the type of exercise.

As another example, in the case of a specific exercise type, images captured by the first camera 322 and the second camera 323 may be applied to the inference process together. In this case, the artificial intelligence model 342 is trained with learning data obtained from images captured from two directions.

Meanwhile, the coaching information output unit 350 according to the exemplary embodiment of the present disclosure may output exercise coaching information on the basis of inference results of the exercise pose analysis unit 340.

In the exemplary embodiment, as shown in FIG. 1, the coaching information output unit 350 according to the exemplary embodiment of the present disclosure may be configured to include an image display unit 352 and a GUI management unit 351.

The image display unit 352 according to the exemplary embodiment of the present disclosure may display an image toward the front of the exercise coaching device 30. According to the exemplary embodiment, the image display unit 352 may be applied with a display panel of an LCD or OLED type.

The GUI management unit 351 according to the exemplary embodiment of the present disclosure may display the exercise coaching information generated by the inference result generation unit 343 on the image display unit 352. In the exemplary embodiment, the exercise coaching information may include a correction image in which correction points, in the correct posture, corresponding to respective key points are displayed.

Here, the GUI management unit 351 may display the correction image on the image display unit 352 to provide the correction information to an exercising object. In the exemplary embodiment, describing with reference to FIG. 6, the left image of FIG. 6 is a correction image when a correct posture is recognized, and the right image of FIG. 6 illustrates an example of a correction image when a correct posture is not recognized.

Figure 6:
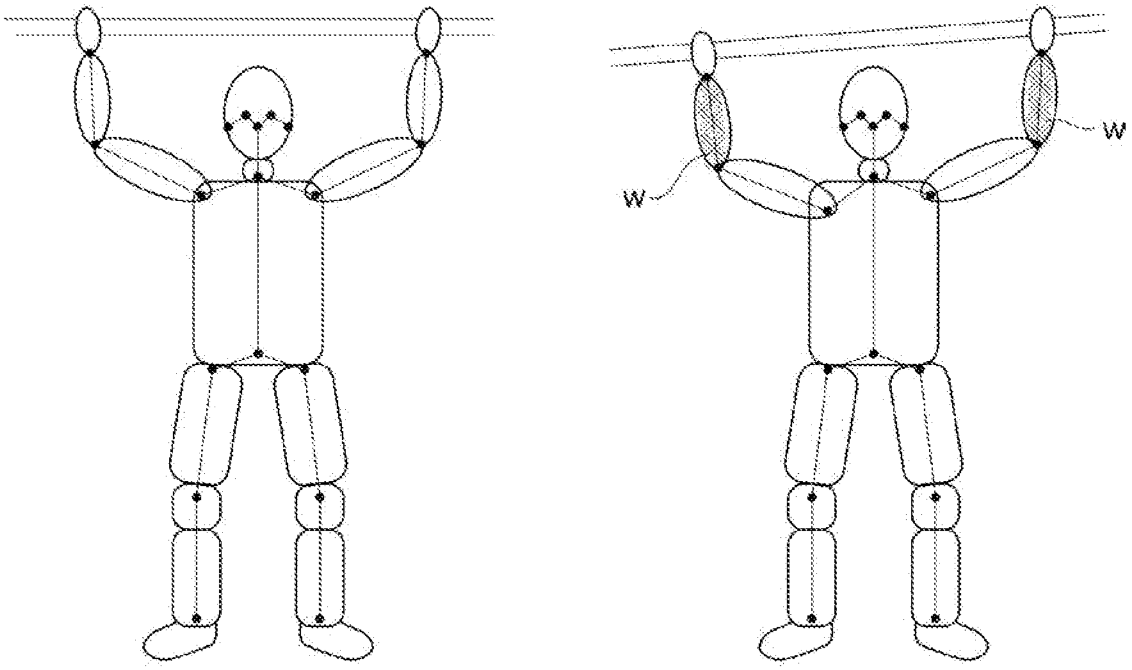
FIG. 6 is a view illustrating an example of exercise coaching information output through a coaching information output unit according to the exemplary embodiment of the present disclosure.

As shown in the right image of FIG. 6, labels W may be displayed on the key points, recognized as an incorrect posture, and skeletal lines connecting therebetween, with respect to respective key points and skeletal lines connecting therebetween, so as to distinguish the incorrect posture from a correct posture. As an example of the labels, a correction image converted in red color may be displayed. That is, the GUI management unit 351 may display, on the image display unit 352, correction points corresponding to key points inferred as the correct posture and correction points corresponding to key points inferred as the incorrect posture, which are inferred by the artificial intelligence model 342, so as to be visually distinguished from each other.

In another exemplary embodiment, the GUI management unit 351 may display, on the image display unit 352, an object image that is a real appearance of a user who is an exercising object, the object image being captured by the image capturing unit 321. In addition, the GUI management unit 351 may overlap and display correction points on the exercising object in the object image. In this way, the user is enabled to visually check which part of his or her posture is incorrect.

As shown in FIG. 1, the coaching information output unit 350 according to the exemplary embodiment of the present disclosure may be configured to further include an audio management unit 353 and a speaker 354.

The audio management unit 353 according to the exemplary embodiment of the present disclosure may output pre-registered posture correction audio through the speaker 354. In the exemplary embodiment, when a posture is not recognized as a correct posture by the exercise pose analysis unit 340. In particular, when a posture is inferred as any one of the plurality of types of incorrect postures, a registered voice, for example, a voice such as "the right shoulder is down" may be output through the speaker 354 in response to the inferred incorrect posture.

According to the configuration described above, a user who is an exercising object may more easily check and correct his or her exercise posture by receiving both of a correction image and correction voice, which are provided through the image display unit 352.

Figure 7:
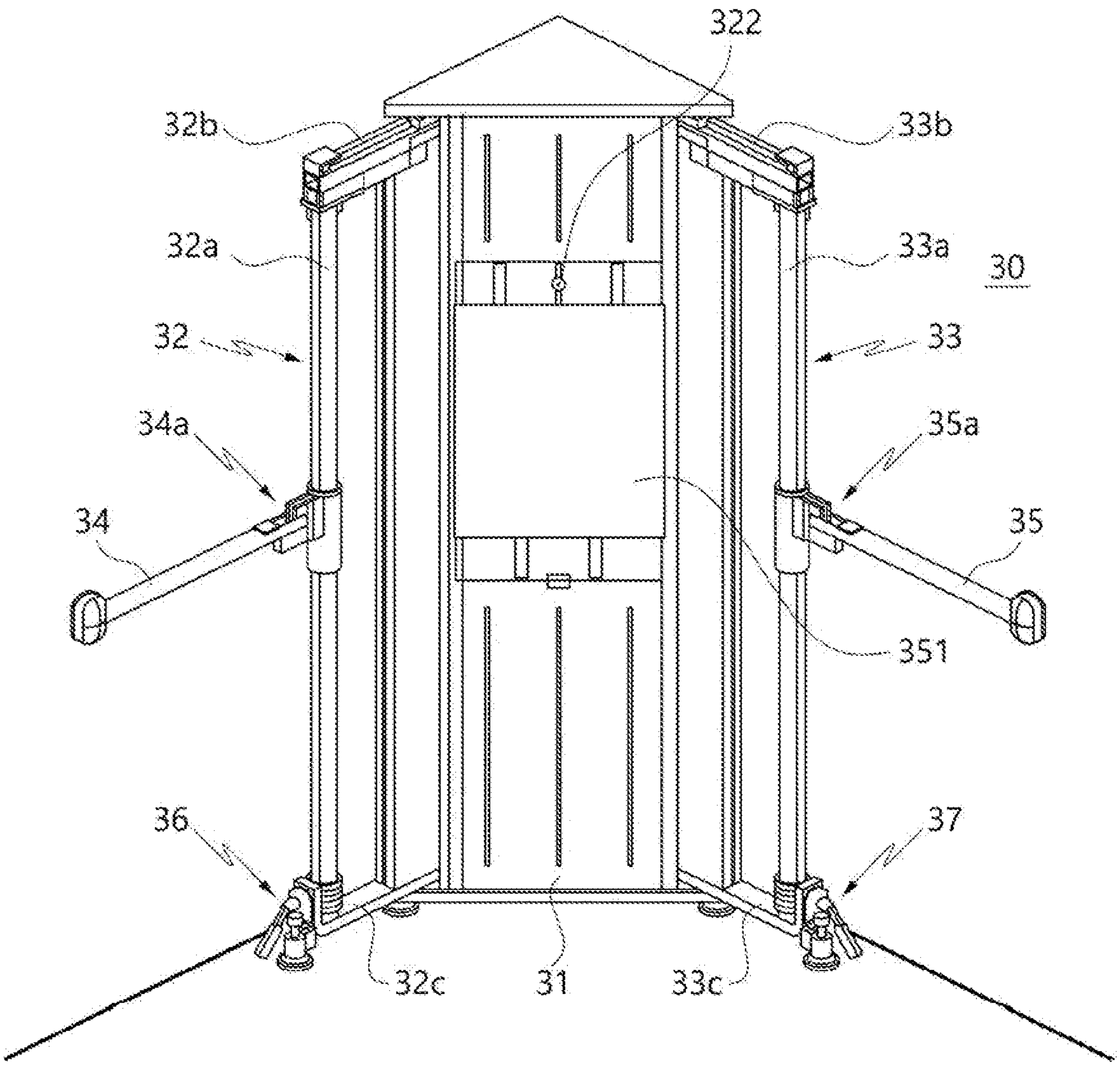
FIG. 7 is a perspective view illustrating an example of a stand-type exercise device to which the exercise coaching device based on the artificial intelligence according to the exemplary embodiment of the present disclosure is applied.

FIG. 7 is a view illustrating an implementation example of the exercise coaching device 30 based on artificial intelligence according to the exemplary embodiment of the present disclosure. As an example, the exercise coaching device 30 shown in FIG. 7 has a form of stand-type exercise equipment.

Referring to FIG. 7, the exercise coaching device 30 according to the exemplary embodiment of the present disclosure may include a main body unit 31, a first side frame 32, and a second side frame 33.

As an example, the main body unit 31 according to the exemplary embodiment of the present disclosure has a polygonal column shape having an internal space thereof. As shown in FIG. 7, as an example, the main body unit 31 has a triangular prism shape having a cross section in the form of a right-angled isosceles triangle. Accordingly, the exercise coaching device 30 may be installed at a corner of an indoor wall.

It is merely an example that the cross section of the exercise coaching device 30 according to the exemplary embodiment of the present disclosure is provided in the form of the right-angled isosceles triangle. As an example, the cross section of the exercise device 30 according to the exemplary embodiment of the present disclosure is provided in a rectangular shape, so as to be installed on a side of a wall surface rather than the corner of the wall.

The main body unit 31 according to the exemplary embodiment of the present disclosure has an internal space thereof, so that various parts may be built therein, and in particular, heavy parts may be built in to serve as a center of gravity, supporting the exercise coaching device 30. In this way, as shown in FIG. 7, the exercise coaching device 30 by itself may maintain a stable standing state while being settled on the floor.

The parts built into the main body unit 31 may include a load supply unit (not shown) for supplying exercise loads. As an example, the load supply unit may include parts such as a motor, a reducer, and a pulley for transferring motion loads of the motor and reducer.

Here, as shown in FIG. 1, the exercise coaching device 30 according to the exemplary embodiment of the present disclosure may be configured to further include an exercise load management unit 360 for controlling the loads of the load supply unit. A user may select a load, that is, a weight, to be applied when he or she exercises, through the user input unit 370, and the exercise load management unit 360 may receive, from the main control unit 310, the provided information about the load that is input by the user, and control the load supply unit.

The main body unit 31 according to the exemplary embodiment of the present disclosure may be provided with the image display unit 352 described above and installed therein. As an example, the image display unit 352 is installed on a front surface of the main body unit 31, so as to display an image toward the front. Here, a one-way transparent mirror (not shown) may be disposed on a front surface of the image display unit 352. The one-way transparent mirror refers to a mirror that acts like a transparent glass in one direction but acts like a mirror in the opposite direction. In this way, when the image display unit 352 is turned off, the one-way transparent mirror acts as the mirror, and when the image display unit 352 is turned on, an image that is displayed on a screen of the image display unit 352 may become viewable through the one-way transparent mirror.

In the exemplary embodiment of the present disclosure, various information required for exercise may be provided through the image display unit 352. For example, through the image display unit 352, exercise coaching images may be provided by overlapping the correction image described above with the exercising object.

The first camera 322 for photographing a user may be installed on the front surface of the main body unit 31 according to the exemplary embodiment of the present disclosure. Although not shown in FIG. 7, the second camera 323 may be installed on a front left side or front right side of the main body unit 31 in a direction toward the user.

The first side frame 32 and the second side frame 33 according to the exemplary embodiment of the present disclosure are installed on both respective sides of the main body unit 31. Here, in the exemplary embodiment of the present disclosure, as an example, the first side frame 32 and the second side frame 33 are accommodated inside the main body unit 31 from both respective sides of the main body unit 31 or are installed to be drawn out from the main body unit 31.

In this way, in a state in which the user has completed the exercise, the first side frame 32 and the second side frame 33 are accommodated inside the main body unit 31, so that utilization of an installation space may be increased.

Whereas, when the user desires to exercise, the first side frame 32 and the second side frame 33 may be drawn out from the main body unit 31. In this case, the first side frame 32 and the second side frame 33 protrude forward from the main body unit 31, that is, as shown substantially in FIG. 4, protrude forward at a predetermined angle, so as to support the main body unit 31, whereby the exercise coaching device 30 according to the present disclosure may be more stably settled on a floor.

The first side frame 32 according to the exemplary embodiment of the present disclosure may be configured to include a first upper frame 32*b*, a first lower frame 32*c*, and a first handle coupling post 32*a*.

The first upper frame 32*b* may be installed on an upper side of the main body unit 31 so as to be accommodated in and drawn out from the main body unit 31. Similarly, the second lower frame 33*c* may be installed on a lower side of the main body unit 3 so as to be accommodated in and drawn out from the main body unit 31.

The first upper frame 32*b* and the first lower frame 32*c* may be provided with rails installed thereon, so as to be slidably movable. Alternatively, the movement of the first upper frame 32*b* and the first lower frame 32*c* may be guided by forms of protrusions or grooves. Here, various forms of configuration for the sliding movement of the first upper frame 32*b* and the first lower frame 32*c* may be applied.

A first handle coupling post 32*a* connects the first upper frame 32*b* to the first lower frame 32*c* in a vertical direction. Here, the first upper frame 32*b* and the first lower frame 32*c* may be accommodated in and drawn out together from the main body unit 31 by the handle coupling posts.

As shown in FIG. 7, the second side frame 33 according to the exemplary embodiment of the present disclosure may have a structure symmetrical to that of the first side frame 32. Similar to the first side frame 32, the second side frame 33 may be configured to include a second upper frame 33*b*, a second lower frame 33*c*, and a second handle coupling post 33*a*.

Here, the configuration of the second upper frame 33*b*, second lower frame 33*c*, and second handle coupling post 33*a* is symmetrically corresponded to that of the first upper frame 32*b*, first lower frame 32*c*, and first handle coupling post 32*a* of the first side frame 32, so a detailed description thereof will be omitted.

The exercise coaching device 30 according to the exemplary embodiment of the present disclosure may be configured to include a first handle bar 34 and a second handle bar 35.

One side of the first handle bar 34 is connected to the first handle coupling post 32*a*. In the exemplary embodiment of the present disclosure, as an example, one side of the first handle bar 34 is coupled to the first handle coupling post 32*a* by a first handle support module 34*a*.

Here, the first handle support module 34*a* may be installed to be movable in a vertical direction along the first handle coupling post 32*a*. In addition, the first handle support module 34*a* may be rotatably installed at a predetermined angle in a horizontal direction, while having a vertical direction as an axis, on the first handle coupling post 32*a*. In addition, the first handle support module 34*a* may be implemented in a structure capable of adjusting an angle of the first handle bar 34 in the vertical direction.

Through such a configuration, the heights of the first handle bar 34 in the vertical direction and angles in the vertical direction and the horizontal direction of the first handle bar 34 may be adjusted to heights and angles desired by the user, so that the heights and angles may become adjustable according to a user's body size or the types of exercise using the exercise coaching device 30 according to the present disclosure.

The configuration of the first handle support module 34*a* for the adjustment of the heights in the vertical direction and angles in the vertical and horizontal directions of the first handle bar 34 may be realized in various forms. As an example, the angles of the first handle bar 34 in the vertical direction may be adjusted by way of realizing a sawtooth-shaped locking jaw that is on a hinge axis and allowed to rotate together in a state where the first handle bar 34 is hinged to the first handle support module 34*a*.

Meanwhile, at an end of the other side of the first handle bar 34, a wire (not shown) connected to the load supply unit described above may be exposed to the outside. To this end, the first handle bar 34 and the first handle coupling post 32*a* may be provided in the form of a pipe capable of accommodating the wire therein. The wire extending from the load supply unit to the end of the first handle bar 34 may be installed to stably transfer loads by using pulleys (not shown) installed in the main body unit 31, the first upper frame 32*b*, the first handle coupling post 32*a*, and the first handle support module 34*a*, and at important positions inside the first handle bar 34.

The wire extending to the outside of the end of the first handle bar 34 is connected to a handle (not shown) that a user grips, so that when the user performs a muscle strength exercise by pulling the handle, the load provided by the load supply unit is transmitted to the wire, thereby enabling the muscle strength exercise.

The second handle bar 35 symmetrical to the first handle bar 34 may be coupled to the second handle coupling post 33*a* via a second handle support module 35*a*. Since the structures of the second handle bar 35, the second handle support module 35*a*, and the second handle coupling post 33*a* are symmetrically corresponded to the first handle bar 34 and so on, a detailed description thereof will be omitted.

The exercise coaching device 30 according to the exemplary embodiment of the present disclosure may be configured to further include a first standing fixing unit 36 and a second standing fixing unit 37.

The first standing fixing unit 36 may be installed at a lower end of the first side frame 32. In the exemplary embodiment of the present disclosure, as an example, there is provided a structure for the first standing fixing unit 36 to be in close contact with a floor surface or spaced apart from the floor surface by operation of a lever in a state where a material with high frictional force such as rubber is attached to a base surface of the first standing fixing unit 36. In this way, in a state of being spaced apart from the floor surface, the first side frame 32 may be accommodated in and drawn out from the main body unit 31, and in a state of being drawn out, the first side frame 32 may be closely in contact with the floor surface, whereby the main body unit 31 and the first side frame 32 may be supported more stably.

In addition, in the above-described exemplary embodiment, it is exemplified that the first handle support module 34*a* is rotatably coupled to the first handle coupling post 32*a* in the vertical direction as an axis, but the first handle support module 34*a* may be fixedly installed to the first handle coupling post 32*a* in a structure of not being able to pivot in the vertical direction.

Here, when the first handle coupling post 32*a* is coupled to the first upper frame 32*b* and the second lower frame 33*c* so as to be freely rotatable, a structure may be implemented so that the first handle bar 34 is able to rotate around an axis in the vertical direction. In this case, when the first standing fixing unit 36 is in close contact with the floor surface in a state of being fixedly installed to the first handle coupling post 32*a*, rotation of the first handle bar 34 is prevented by the first standing fixing unit 36, and at the same time, the exercise coaching device 30 may be stably settled on the floor.

The second standing fixing unit 37 according to the exemplary embodiment of the present disclosure is installed on the second side frame 33 and symmetrically corresponds to the structure of the first standing fixing unit 36, and thus a detailed description thereof will be omitted.

Although the exemplary embodiments of the present disclosure have been described above with reference to the accompanying drawings, it will be understood that those skilled in the art to which the present disclosure pertains may implement the present disclosure in other specific forms without departing from the technical spirit or essential features thereof. Therefore, it should be understood that the above-described exemplary embodiments are illustrative in all respects and not restrictive.

DESCRIPTION OF THE REFERENCE NUMERALS IN THE DRAWINGS

30: exercise coaching device 310: main control unit
320: captured image management unit 321: image capturing unit
322: first camera 323: second camera
330: exercise pose extraction unit 331: image pre-processing unit
332: key point extraction unit 333: pose data generation unit
340: exercise pose analysis unit 341: data pre-processing unit
342: artificial intelligence model 343: inference result generation unit
350: coaching information output unit 351: GUI management unit
352: image display unit 353: audio management unit
354: speaker 360: exercise load management unit
370: user input unit

INDUSTRIAL APPLICABILITY

The present disclosure may be applied to exercise equipment installed in homes, fitness centers, and the like.

The invention claimed is:

1. An exercise coaching device based on artificial intelligence, the exercise coaching device comprising:

an image capturing unit configured to capture an exercise image of an exercising object;

an exercise pose extraction unit configured to generate pose data by extracting an exercise pose of the exercising object from the exercise image;

an exercise pose analysis unit based on the artificial intelligence and configured to receive the pose data and infer whether the exercise pose is in a correct posture or not; and a coaching information output unit configured to output exercise coaching information on the basis of an inference result of the exercise pose analysis unit, wherein the exercise pose analysis unit comprises an artificial intelligence model configured to receive the pose data and infer whether the exercise pose is in the correct posture or not, wherein the artificial intelligence model is generated by learning with correct posture learning data and at least two or more types of incorrect posture learning data, wherein the artificial intelligence model is configured to infer the exercise pose as any one of the correct posture and the at least two or more types of incorrect postures, wherein the exercise pose analysis unit further comprises a data pre-processing unit configured to pre-process the pose data obtained from the exercise pose extraction unit so as to correspond to a format of input data of the artificial intelligence model, and wherein, in a case where there exists a key point missing from the pose data, the data pre-processing unit restores pose data for the corresponding key point through a pre-registered interpolation technique.

2. The exercise coaching device of claim 1, wherein the exercise pose extraction unit extracts, as the exercise pose, a plurality of key points preset for the exercising object in the exercise image.

3. The exercise coaching device of claim 2, wherein the key points comprises at least two or more positions of both eyes, both ears, the nose, the neck, hips, and a plurality of joints.

4. The exercise coaching device of claim 2, wherein the exercise pose extraction unit extracts the key points in units of a predetermined number of frames from the exercise image of predetermined one cycle, and generates the pose data by converting the key points for one cycle into time-series coordinate data.

5. The exercise coaching device of claim 1, wherein the data pre-processing unit receives an input of exercise type information of a current exercise of the exercising object, extracts pose data for the key points according to the exercise type information from the pose data, and transmits the extracted pose data as the input data of the artificial intelligence model.

6. The exercise coaching device of claim 1, wherein the exercise pose analysis unit further comprises an inference result generation unit configured to generate, as the exercise coaching information, correction information for posture correction in a case where the artificial intelligence model infers that the exercise pose is the incorrect posture.

7. The exercise coaching device of claim 6, wherein the coaching information output unit comprises:

an image display unit configured to display an image toward a front thereof, and a GUI management unit configured to display the exercise coaching information generated by the inference result generation unit on the image display unit.

8. The exercise coaching device of claim 7, wherein the exercise coaching information comprises a correction image in which correction points, in the correct posture, corresponding to the respective key points are displayed, and the GUI management unit displays the correction image on the image display unit.

9. The exercise coaching device of claim 8, wherein the GUI management unit displays an object image for the exercising object photographed by the image capturing unit on the image display unit, and overlaps and displays the correction points on the exercising object in the object image.

10. The exercise coaching device of claim 9, wherein the GUI management unit displays, on the image display unit, correction points corresponding to key points inferred as the correct posture and correction points corresponding to key points inferred as the incorrect posture, which are inferred by the artificial intelligence model, so as to be visually distinguished from each other.

11. The exercise coaching device of claim 1, wherein the data pre-processing unit restores pose data for the corresponding key point through one of a linear interpolation technique, a polynomial interpolation technique and a spline interpolation technique.

* * * * *